June 16, 1964 R. WATTS 3,137,221
FILM DRIVE MECHANISM FOR PHOTOGRAPHIC CAMERAS
Filed June 30, 1961
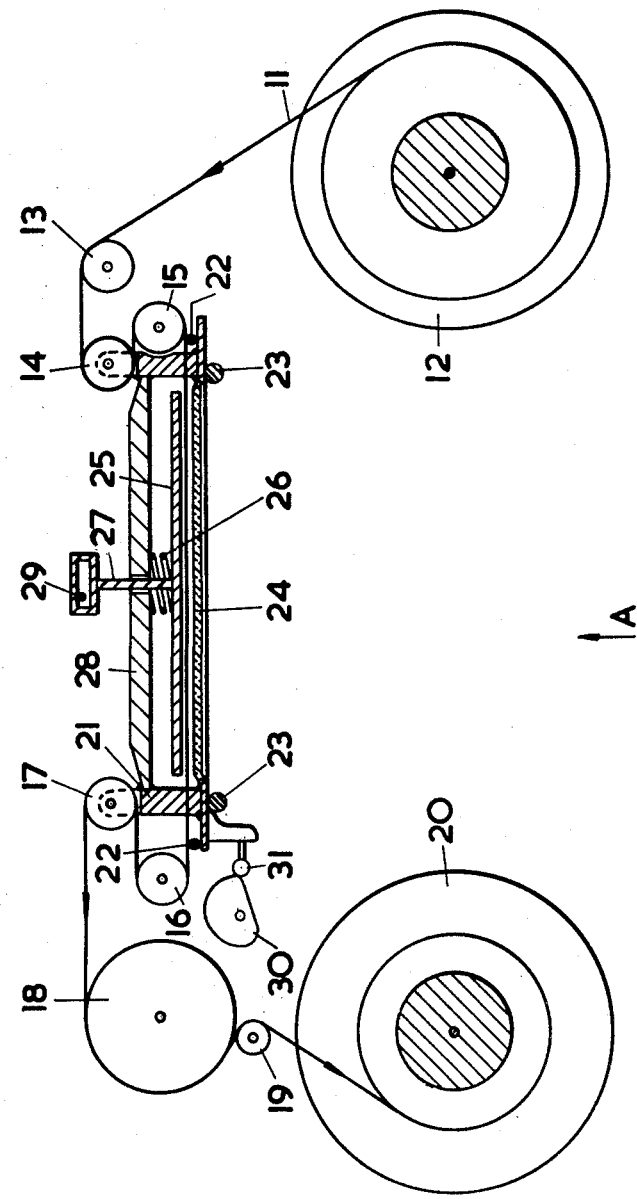
Inventor
Reginald Watts
By
Cushman, Darby & Cushman
Attorneys

United States Patent Office 3,137,221
Patented June 16, 1964

3,137,221
FILM DRIVE MECHANISM FOR PHOTOGRAPHIC CAMERAS
Reginald Watts, Farnborough, England, assignor to Minister of Aviation, in Her Majesty's Government of the United Kingdom of Great Britain and Northern Ireland, London, England
Filed June 30, 1961, Ser. No. 121,237
Claims priority, application Great Britain July 6, 1960
3 Claims. (Cl. 95—31)

This invention relates to film drive mechanism for photographic cameras and especially to such mechanism in which the film is fed continuously as in some aircraft cameras.

It is already known in air photography to compensate for the movement of the image consequent upon the forward speed of the aircraft by causing the film to travel during exposure with and at a speed approaching or substantially equal to that of the image.

According to this invention, in continuous feed film drive mechanism for a photographic camera, the film is looped upon itself at the supply side of the exposure area around fixed guide means and guide means on a moving carriage which latter extends across said area and is also looped upon itself around fixed guide means and guide means on said carriage at the take-up side of the exposure area, and, the carriage is itself engaged with the film and moved forward with and by the film to shorten the take-up loop and lengthen the supply loop and so reduce the film speed across the exposure area during each exposure, on the one hand, and then is itself disengaged from the film and moved in the reverse direction relatively to the film by drive means provided for the purpose to shorten the supply loop and lengthen the take-up loop and so increase the film speed across the exposure area during each interval between successive exposures, on the other hand.

In general, the fixed guide means and the guide means on the carriage will be in the form of rollers on fixed mountings and rollers on the carriage, respectively.

Conveniently, cam means are employed to impart the reverse motions or strokes to the carriage and to free it for its forward motion wtih the film, and further cam or equivalent pin and slot type means serve to effect the engagement and disengagement of the carriage from the film.

For use, the cam or other means employed for imparting the reverse motions or strokes to the carriage will, in general, be coupled directly or indirectly with the shutter operating means of a camera for operation in synchronism therewith, for example, both said reverse motion imparting means and the shutter operating means of a camera may be coupled to a constant speed film drive roller which co-operates with the film after the latter has traversed the carriage guide means around which it is looped at the take-up side of the exposure area.

One form of film drive mechanism according to the invention is illustrated by way of example by the accompanying diagrammatic drawing which is not to scale.

As there shown, film 11 from a supply spool 12 is looped upon itself around a fixedly mounted guide roller 13, a roller 14 or an open frame carriage 21 and a fixedly mounted roller 15, whence it traverses the upper face of a register glass 24 fixed in the cariage 21, to the opposite or take-off side of the latter, where it is again looped upon itself this time around a fixed guide roller 16, a roller 17 on the carriage 21 and a combined guide and constant speed drive roller 18, from between which and roller 19 it passes to a take-up spool 20. The carriage is supported between two upper rollers 22, 22 and two lower rollers 23, 23 for movement to the right and to the left, to and from the position in which it is shown in the drawing where the supply loop around rollers 13, 14 and 15 is of minimum length and the take-up loop around rollers 16, 17 and 18 is of maximum length. A drive cam 30, in driving connection (not shown) with the film drive roller 18, is rotatable anti-clockwise for co-operation with a follower member 31 mounted rigidly on the carriage 21 to move the latter to the right and, as it rotates anti-clockwise beyond the position shown to permit the carriage 21 to move to the left. In addition to the register glass 21 fixedly secured thereto, the carriage 21 has movable upwardly and downwardly thereon under the action of a coiled compression spring 26 and a pin and slot type cam device indicated generally at 29 and of which the follower portion is joined to the back plate 25 by a rigid stem 27 extending freely through a bridge portion of the carriage 21 between the supply and take-up ends of the latter.

The direction in which light falls upon the film through the register glass 24 to effect an exposure is indicated by the arrow A.

As stated above, the driving cam 30 rotates anti-clockwise. As shown, this cam 30 has completed a stroke of the carirage 21 to the right, the pin and slot type cam means 29 is holding up the back plate 25 against the influence of the spring 26 and clear of the film 11 at the upper face of the register glass 24. When the tip of the cam 30 clears the follower 31 the cam device 29 releases the back plate 25 to move downwardly under the influence of the spring 26 and clamp the film firmly between it and the register glass 24, thus effectively engaging the carriage 21 with the film on the register glass 24. Under the influence of the constant speed drive roller 18 around which the film continues to pass at the same rate, the take-up loop of film around the carriage roller 17 shortens, drawing to the left the carriage 21 and that part of the film which is held firmly between the back plate 25 and the register glass 24 and at the same time lengthening the supply loop of film around the other carriage roller 14.

It is during this leftwards stroke of the carriage 21 with a portion of the film clamped firmly thereto and moving therewith at the same speed, that an exposure is effected, the shutter mechanism (not shown, as it forms no part of the invention) being operated in synchronism with the driving cam 30.

This leftwards stroke is terminated when the cam 30 comes to bear once again, at its more rounded end, upon the follower 31. As the cam 30 commences to drive the carriage to the right the cam device 29 raises the back plate 25 and so frees the exposed film to move still to the left but at a greater speed under the added influence of the roller 17 which (now moving to the right with the carrier 21) now lengthens the take-up film loop around it as the roller 14 (also moving to the right with the carrier 21) shortens the supply loop. By the time this stroke of the carriage 21 to the right is completed the moving parts once again occupy the positions shown in the drawing and the next unexposed portion of the film is above the register glass 24 ready to be clamped thereto for subsequent exposure during the immediately following stroke of the carriage to the left.

The driving cam 30 with the follower 31 and the cam device 29 are so arranged that in consequence of the slackening of the film between the supply side roller 13 and the take-up side roller 18 as the nib of the cam 30 clears the follower 31, the carriage 21 is already moving to the left at a speed at least approaching that of the film above the register glass 24 at the moment when the back plate 25 moves downwardly and clamps the film firmly to the carriage 21. In this way there is little or no shock as the carriage is thus engaged with the film for movement therewith.

In some cases, means may be provided for damping the movement of the carriage with the film in order to ensure steady motion of the film during exposure.

It can be shown that in film drive mechanism like that described and illustrated, the film speed during the left hand strokes of the carriage 21 is equal to one third of the film speed around the constant speed drive roller 18 and further that this speed is correct for image movement compensation for air photography when the coverage overlap of successive pictures taken is about sixty-six percent.

I claim:

1. A continuous film drive mechanism for a photographic camera including constant speed drive means, a carrier mounted at the supply side of said drive means for forward and reverse motion in the same direction and in the opposite direction to the film, register means operatively associated with said carrier for supporting the film during exposure, a guide roller on the carrier and a fixed guide roller at the supply side of the register means for defining a supply loop in the film, a guide roller on the carrier and a fixed guide roller at the take-up side of the register means for defining a take-up loop in the film, means for automatically and prior to each exposure establishing driving engagement of the film with the carrier to move the latter forwardly with the film thereby shortening and lengthening the take-up and supply loops, respectively, and reducing the speed of the film between said loops, means for automatically and subsequent to each exposure removing said driving engagement of the film with the carrier and moving the latter reversely thereby lengthening and shortening the take-up loops, respectively, and increasing the speed of the film in the intervals between successive exposures.

2. A continuous film drive mechanim for a photographic camera as set forth in claim 1 wherein the means for automatically establishing driving engagement of the film with the carrier includes a cam-operated clamping device for frictionally gripping and holding the film flat against the register means.

3. A continuous film drive mechanism for a photographic camera as set forth in claim 1, wherein the means for moving the carrier reversely includes a cam mounted for rotation about a fixed axis and a follower member on the carriage from which the cam rides clear at the end of each reverse movement of the carriage.

References Cited in the file of this patent
UNITED STATES PATENTS

| | | |
|---|---|---|
| 1,045,905 | Stilwell | Dec. 3, 1912 |
| 2,474,323 | Rattray | June 28, 1949 |
| 2,593,088 | Baker | Apr. 15, 1952 |
| 2,914,619 | Sweeney et al. | Nov. 24, 1959 |
| 2,950,663 | Warshawsky | Aug. 30, 1960 |

UNITED STATES PATENT OFFICE

CERTIFICATE OF CORRECTION

Patent No. 3,137,221   June 16, 1964

Reginald Watts

It is hereby certified that error appears in the above numbered patent requiring correction and that the said Letters Patent should read as corrected below.

Column 1, line 62, for "or" read -- on --; column 2, line 16, after "portion" insert -- 28 --.

Signed and sealed this 19th day of January 1965.

(SEAL)
Attest:

ERNEST W. SWIDER
Attesting Officer

EDWARD J. BRENNER
Commissioner of Patents